United States Patent

[15] 3,643,681

Simmons

[45] Feb. 22, 1972

[54] TURBULENCE-DAMPENED FLOAT CONTROL

[72] Inventor: Edward C. Simmons, Dayton, Ohio
[73] Assignee: General Motors Corporation, Detroit, Mich.
[22] Filed: Nov. 16, 1970
[21] Appl. No.: 89,824

[52] U.S. Cl. .................................137/429, 251/64
[51] Int. Cl. ...............................................G05d 9/12
[58] Field of Search.............137/409, 410, 429, 430, 431, 137/432, 433; 134/56 D, 57 D; 73/322.5

[56] References Cited

UNITED STATES PATENTS

| | | | |
|---|---|---|---|
| 1,653,688 | 12/1927 | Alexander et al. | 137/429 X |
| 2,586,619 | 2/1952 | Davis | 137/429 X |
| 2,621,666 | 12/1952 | Ornas | 134/57 D |
| 3,464,437 | 9/1969 | Zane | 137/387 |

Primary Examiner—M. Cary Nelson
Assistant Examiner—David R. Matthews
Attorney—William S. Pettigrew and Frederick M. Ritchie

[57] ABSTRACT

A standpipe extending upward from the bottom of a liquid container is provided with external helical square threads. A float fits over the standpipe and has a standpipe-operating rod extending down through the standpipe to a control switch below the container. The switch controls a valve for filling the container with liquid to a predetermined liquid level. The float is provided with a sheet metal nut having inwardly projecting teeth engaging the helical threads for rotating the float as the changing liquid level raises and lowers the float relative to the standpipe.

4 Claims, 5 Drawing Figures

PATENTED FEB 22 1972

INVENTOR.
Edward C. Simmons
BY
Frederick M. Ritchie
ATTORNEY

TURBULENCE-DAMPENED FLOAT CONTROL

This invention relates to float controls and, more particularly, to float controls in rapidly changing bodies of liquid or in liquid in which the surface is churning or rough, thereby causing bobbing of the float controls. A typical environment suitable for use with this invention is a dishwashing chamber and, more particularly, the fill system therefor.

It has been found in bodies of rapidly circulating or churning liquid, the surface of the liquid is apt to be very rough causing rapid and repeated bobbing of the float control resulting in various switch and control problems such as momentary contacting and irregular coordination of fill to achieve a desired liquid level as well as ineffectiveness and unreliability in controlling the liquid level against overfill. A further problem exists where a bobbing float controls electrical flow through a switch. The momentary interruption of such electrical flow at the switch causes interference with radio and television reception.

Accordingly, it is an object of this invention to provide a float control for a liquid fill system which minimizes the effect of a rough liquid surface on the fill system and which will minimize the bobbing of the float adjacent the liquid surface.

It is another object of this invention to provide a float control which will be substantially responsive to the predetermined desired liquid level and which will effectively and reliably control to said liquid level regardless of the circulation and the churning and the roughness of the surface of the liquid.

Further objects and advantages of the present invention will be apparent from the following description, reference being had to the accompanying drawings wherein a preferred embodiment of the present invention is clearly shown.

Figure 2:
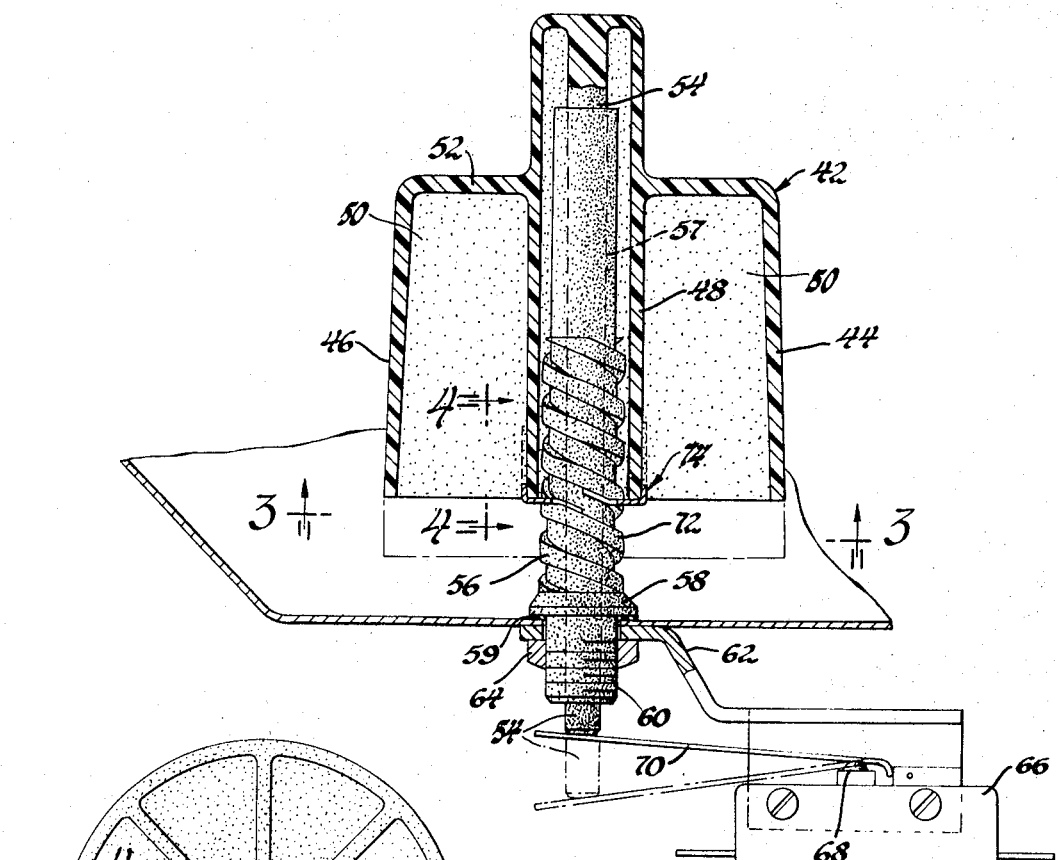
FIG. 2 is an enlarged vertical, sectional view, partly in elevation, of the float control shown in FIG. 1 with the float in its tub-filled position (solid line) and its tub-empty position (phantom line)
Figure 3:
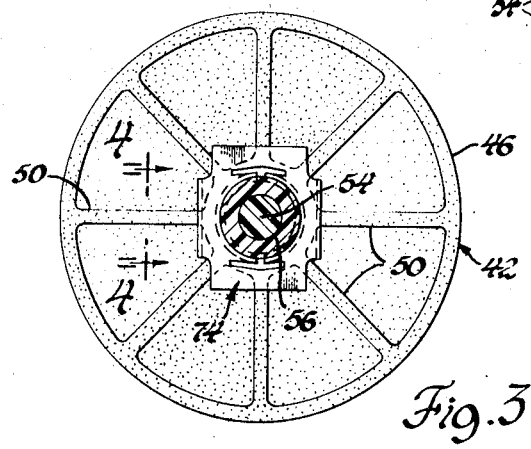
FIG. 3 is a bottom sectional view of the float and guide taken substantially along the line 3—3 of FIG. 2.
Figure 4:
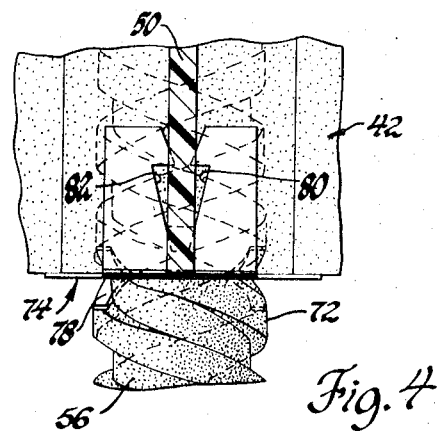
Figure 5:
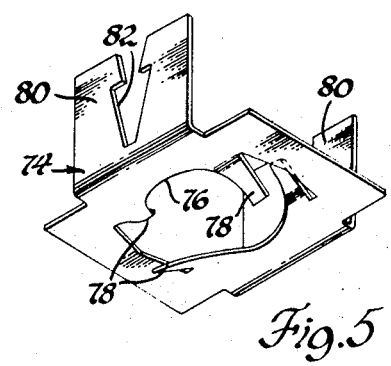

FIG. 4 is a fragmentary side sectional view taken substantially along the line 4—4 of FIGS. 2 and 3 showing a portion of the float and the standpipe guide; and FIG. 5 is a perspective view of the sheet metal nut shown in FIGS. 3 and 4.

Figure 1:
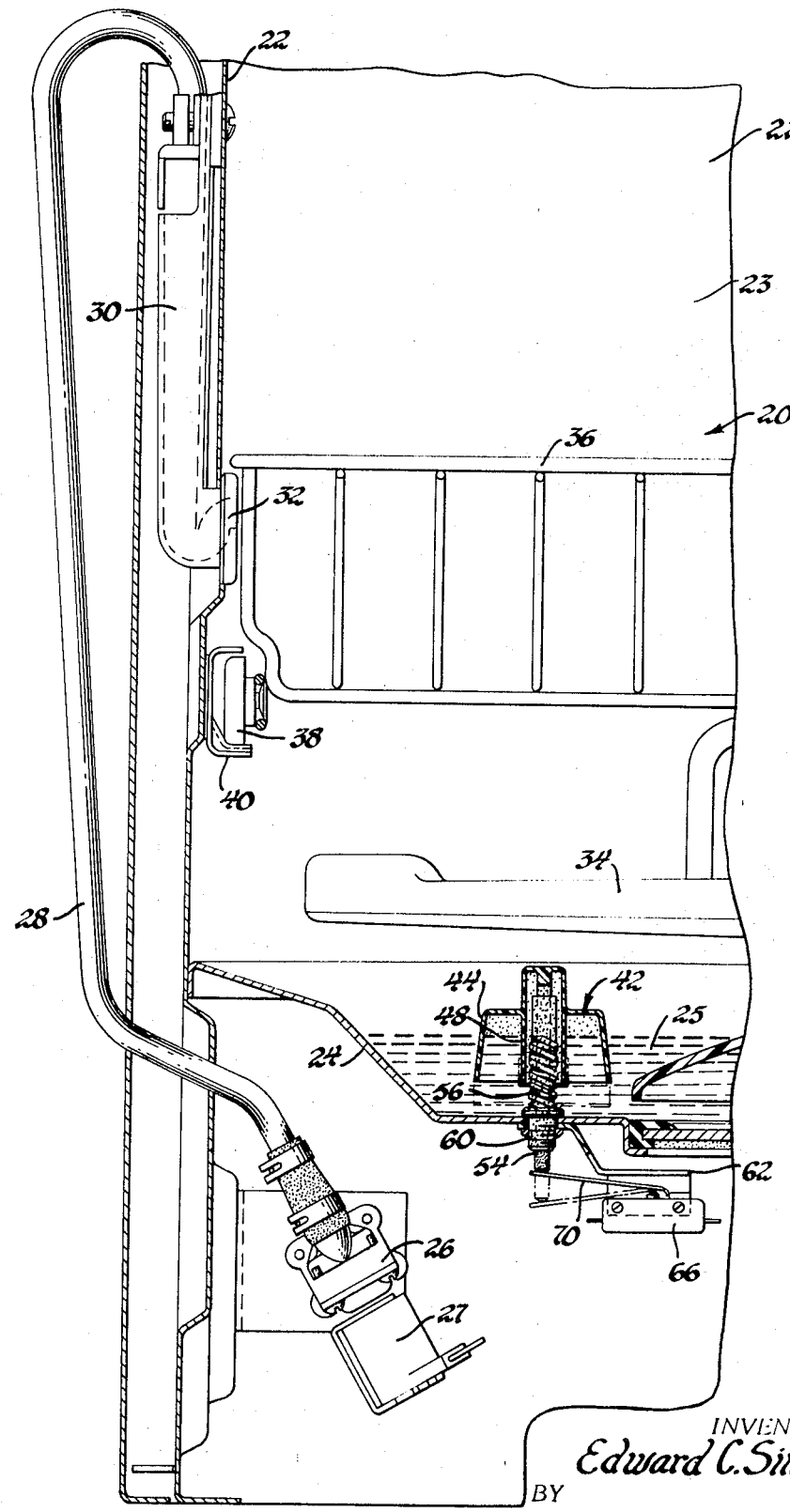
FIG. 1 is a fragmentary, vertical, sectional view, partly in elevation, through a dishwasher embodying a float control incorporating one form of my invention.

For the purpose of illustrating one application of my invention, there is shown in FIG. 1 a portion of a dishwasher 20 including upright side walls 22 forming a dishwashing chamber 23 and provided with a bottom wall 24 forming a tub sump or liquid container 25. The dishwasher is provided with a fill control device comprising a fill valve 26 actuated by a solenoid 27. The fill control device controls the flow of liquid through a supply pipe 28, airgap and trap 30 and then through an entrance 32 leading to the liquid chamber or tub sump 25 of the dishwasher. The dishwasher includes a pump, not shown, which pumps liquid from the sump 25 into the rotating spray member 34 which rotates and sprays the liquid onto the dishes which are held in the dish basket 36. The basket 36 may be supported on rollers 38 operating in a track 40 so that the basket is removable from the dishwashing chamber. Additional dishwasher structure suitable for use with my invention is described in U.S. Pat. No. 3,292,645, granted Dec. 20, 1966.

In such a dishwasher, it is customarily desired to stop the inflow of liquid when the liquid reaches a certain predetermined level within the sump 25. Frequently, it is desired that this fill control operate satisfactorily even when the pump is in operation circulating the liquid in the dishwashing chamber. I have provided a float control for this purpose which includes the fill control device and is designated generally by the reference numeral 42. In addition to the fill control device, the float control comprises a float 44 in the general form of an inverted cup which may be formed of a suitable lightweight plastic material such as polypropylene or polyethylene or polystyrene or polyurethane foam, for example. This float includes a slightly conical outer wall 46 and an inner vertical cylindrical wall 48 forming a socket. Radial vanes or partitions 50 join the inner cylindrical wall 48 with the slightly conical outer wall 46 and a circular integral disk-shaped top wall 52 forming the covering member between the cup-shaped outer wall 46 and the inner cylindrical wall 48. The cylindrical wall 48 extends to a closed portion located a substantial distance above the top wall 52. This closed top portion connects to a downwardly extending, control actuating rod portion 54.

The float control also includes a combined rotational and linear guide means 56 in the form of a hollow, threaded, upright standpipe 57. The upright standpipe has a tapered flange 58 at its bottom which rests upon a gasket 59 which, in turn, rests upon the tub bottom wall 24. Below the tapered flange 58 is a threaded portion 60 extending through the gasket and the aperture in the tub bottom 24 as well as through an aperture in a control support bracket 62. Beneath the control support bracket 62, the threaded portion is provided with a fastening nut 64 to fasten the guide means 56 to the bottom of the tub. The control support bracket 62 is provided with a sensitive microswitch 66 which may be single throw, single pole connected between an electrical power supply and the solenoid 27 to provide the necessary control of the fill valve 26. This switch 66 is provided with an operating plunger 68, preferably spring pressed upwardly against an operating lever or arm 70 extending laterally across the axis of the standpipe in the linear guide means 56. The rod 54 extends down through the hollow interior of the standpipe and is guided thereby to rest upon or otherwise operably connect with the operating lever 70 of the switch 66.

The assembly of the float control to the dishwasher allows for removal of the float for cleaning. With dish rack 36 removed, the float 44 merely lifts off the upright standpipe guide means 56. The guide means 56 is independently attached to the bottom wall 24 in advance of locating the float 44 thereon.

With the unthreaded standpipe and guide of the prior art, it was found that the fill control would operate satisfactorily when the liquid was relatively quiescent within the tub. However, during fill and recirculation periods when the liquid was churning and recirculating rapidly, there was considerable turbulence in the dishwashing chamber. Such turbulence caused the prior art float to bob rapidly up and down thereby causing erratic and false indications of the liquid level in the sump and momentary making and breaking of the contacts of the switch 66.

According to my invention, to prevent this objectionable bobbing due to the turbulence of the liquid, I provide a set of double square helical threads 72 on the outer surface of the standpipe of the guide means 56 and a nut 74 on the float 44 for controlling the rotation of said float. I noted that when the mass of liquid circulated past and around the float 44, this action tended to impart a slight rotary motion to the float in the counterclockwise direction (viewed from above). Inasmuch as the liquid in the sump during the period of turbulence tends to swirl in the same counterclockwise direction about the guide means 56, a right-hand thread on the standpipe would provide an additive lifting effect on the float-swirl plus rising fill level. It is preferable to have liquid level or depth alone influence the motion of the float. For this reason, it was found desirable to make the threads 72 a left-handed thread. The lift due to liquid swirl in the dishwashing chamber was cancelled and float motion was dampened. The threads have a 0.571 pitch (1¾ threads per inch) to provide the correct combination of lift and drag consistent with smooth float motion. The standpipe guide means 56 are made of nylon providing a smooth threaded surface. It is important that there be a minimum of friction between the thread 72 and nut 74 throughout the operating life of the float control.

Between the float 44 and the square thread 72 there is provided a sheet metal nut 74 shown in FIG. 5. It is preferably formed of thin stainless steel. It includes an irregular central aperture 76 provided with tangentially extending projections 78 which loosely engage the threads 72. The nut 74 is also provided with two outwardly and upwardly extending arms 80 provided with slots 82 substantially in the shape of arrowheads which are adapted to receive and grip a pair of diametrically opposite vanes or partitions 50 of the float 44, as is particularly shown in FIG. 4.

With this nut 74 so coupling the float 44 to the threads 72, the float 44 will be forced to rotate as it rises and falls with the changing level of the liquid above the bottom wall 24 of the tub. This introduces rotational inertia which acts to regulate the upward and downward movement of the float so as to minimize the irregular bobbing of the float when the liquid level changes rapidly and is rough and turbulent. I have found that the rotational inertia introduced into the float control by the guidance of the thread 72 introduces a particularly effective form of dampening. Such dampening effectively controls undesirable float bobbing so that my invention is also useful in many other liquid level responsive control applications.

While the embodiment of the present invention as herein disclosed constitutes a preferred form, it is to be understood that other forms might be adopted.

I claim:

1. A float control including a float adapted to float adjacent a liquid surface, a combined rotational and linear guide means including thread means for guiding the movement of said float substantially along a predetermined linear path perpendicular to said liquid surface with coincidental controlled rotation of said float to dampen movement of said float along said linear path as the level of said liquid surface is changed, and a control device operably connected to and operated by said float through said guide means coincidentally to the movement of said float along said predetermined linear path.

2. A float control including a float adapted to float adjacent the surface of a liquid which is subjected to rotary circulation in one direction, guide means for guiding the float substantially in a predetermined linear path when the level of the surface of the liquid is increased, said guide means including helical thread means, nut means engaging the helical thread means and cooperating with said thread means for rotating said float coincidentally to the movement of said float along said linear path, said thread means being adapted in cooperation with said nut means to move said float rotatingly downwardly when said nut means to move said float rotatingly downwardly when said float is rotating in the same direction as said liquid and rotatingly upwardly when said float is rising with the increasing level of the liquid surface whereby to cancel the effect of said rotary circulation on the ability of said float to float adjacent the surface of said liquid, and a control device operably connected to and operated by said float coincidentally to the movement of said float along said linear path.

3. A float control including a float adapted to float adjacent a liquid surface above a liquid container wall, guide means for guiding the float substantially in a predetermined linear path perpendicular to said liquid surface as the level of said liquid surface is changed, said guide means comprising a hollow standpipe extending from said liquid container wall to a point above said liquid surface and including on the outside thereof helical thread means extending coaxially relative to said linear path, said float comprising an inverted cup having an integral socket fitting over said standpipe and a nut connected to said socket and in threaded engagement with said thread means, whereby said float is caused to rotate coincidentally with its movement along said linear path, a control device below said liquid container wall adjacent said standpipe and having an operating arm underlying said standpipe, and a rod integral with said float and depending from said socket through said hollow standpipe and operably biasing said operating arm in a point contact to facilitate relative rotation between said rod and said operating arm, said rod being operated by said float to operate said control device coincidentally to the movement of said float along said linear path.

4. In combination with a dishwashing chamber having a sump, fill valve means for filling said sump with liquid to a predetermined surface level, and means for circulating said liquid in said chamber in a manner which effects rotary circulation of liquid in said sump in one direction, a float control for said fill valve means including a float adapted to float adjacent the surface of said liquid, guide means for guiding the float substantially in a predetermined linear path perpendicular to said liquid surface as the level of said liquid surface increases to said predetermined level, said guide means comprising a hollow standpipe extending from said sump to a point above said liquid surface and including on the outside thereof helical thread means extending coaxially relative to said linear path, said float comprising an inverted cup having an integral socket fitting over said standpipe and a nut connected to said socket and in threaded engagement with said thread means, whereby said float is caused to rotate coincidentally with its movement along said linear path, a control device operably connected to said fill valve means and operable to close said fill valve means when said liquid surface is at said predetermined surface level, said control device being below said liquid container wall adjacent said standpipe and having an operating arm underlying said standpipe, and a rod integral with said float and depending from said socket through said hollow standpipe and operably biasing said operating arm in a point contact to facilitate relative rotation between said rod and said operating arm, said rod being operated by said float to operate said control device coincidentally to the movement of said float along said linear path, said helical thread means being adapted in cooperation with said nut to move said float rotatingly downwardly when said float is rotating in the same direction as said liquid in said sump and rotatingly upwardly when said float is rising with the increasing level of the liquid surface as said sump is filled whereby to cancel the effect of said rotary circulation on the ability of said float to float adjacent the surface of said liquid.

* * * * *